(12) United States Patent
Tamura et al.

(10) Patent No.: US 7,666,236 B2
(45) Date of Patent: Feb. 23, 2010

(54) HYDROGEN GENERATOR, METHOD OF SHUTTING DOWN OPERATION OF HYDROGEN GENERATOR, AND FUEL CELL SYSTEM

(75) Inventors: Yoshio Tamura, Nara (JP); Akira Maenishi, Osaka (JP); Yuji Mukai, Osaka (JP); Tomonori Asou, Nara (JP); Kunihiro Ukai, Nara (JP)

(73) Assignee: Panasonic Corporation, Osaka (JP)

( * ) Notice: Subject to any disclaimer, the term of this patent is extended or adjusted under 35 U.S.C. 154(b) by 865 days.

(21) Appl. No.: 10/998,059

(22) Filed: Nov. 29, 2004

(65) Prior Publication Data

US 2005/0132649 A1    Jun. 23, 2005

(30) Foreign Application Priority Data

Dec. 5, 2003    (JP)    ............... 2003-407168

(51) Int. Cl.
*B01J 8/00* (2006.01)
*C10J 3/46* (2006.01)

(52) U.S. Cl. ............... 48/197 R; 48/198.1; 48/198.7; 48/127.9; 48/127.5; 48/127.7; 48/61; 48/127.1; 422/198; 422/190; 422/211; 429/17; 429/19

(58) Field of Classification Search ............... 48/197 R, 48/61

See application file for complete search history.

(56) References Cited

U.S. PATENT DOCUMENTS 4,965,143 A    10/1990    Mizuno et al.

7,387,650 B2 *    6/2008    Omoto et al. ............... 48/61
2003/0044334 A1    3/2003    Kadowaki et al.
2004/0068933 A1    4/2004    Nakamura et al.

FOREIGN PATENT DOCUMENTS

| EP | 1316529 | 6/2003 |
|---|---|---|
| EP | 1486456 | 12/2004 |
| JP | 3247501 | 11/1991 |
| JP | 03247501 | 11/1991 |
| JP | 2000095504 | 4/2000 |
| WO | 03078311 | 9/2003 |

* cited by examiner

*Primary Examiner*—Jennifer Michener
*Assistant Examiner*—Kaity V. Handal
(74) *Attorney, Agent, or Firm*—Dickinson Wright PLLC

(57) ABSTRACT

A hydrogen generator of the invention includes: a reformer for generating a hydrogen-rich gas from a feed gas and water by a reaction using a reforming catalyst body and sending it out from an outlet port; a material feed system for feeding the feed gas to the reformer; a burner for supplying, to the reforming catalyst body, heat generated by mixing a fuel gas with air and burning it; and an air supply system for supplying air to the burner; wherein, when purging an interior of the reformer using the feed gas in shutting down the hydrogen generator, an amount of the air supplied is increased to put out a flame of the burner, and a purge gas sent out from the outlet port by the purging is mixed and diluted with the air in the burner and is discharged outside.

4 Claims, 7 Drawing Sheets

HYDROGEN GENERATOR, METHOD OF SHUTTING DOWN OPERATION OF HYDROGEN GENERATOR, AND FUEL CELL SYSTEM

BACKGROUND OF THE INVENTION

1. Field of the Invention

The present invention relates to a hydrogen generator and a method of shutting down its operation as well as a fuel cell system, and more particularly to a hydrogen generator in which an interior of a reformer can be purged so that a combustible gas emitted to its outside can be appropriately processed and a method of shutting down its operation as well as a fuel cell system.

2. Description of the Related Art

There are known reformers (reformer systems) that generate a reformed gas containing hydrogen as its main component by a steam reforming reaction with steam and an organic material such as natural gas or naphtha.

Among reforming catalyst bodies that contribute to this steam reforming reaction is one in which a carrier such as alumina carries a Ni-based or a Ru-based catalyst. The performance of the reforming catalyst body, however, greatly depends on the atmosphere of the surrounding environment; for example, the Ni-based catalyst can exhibit its expected performance in a reduced state but its catalytic activity deteriorates in an oxidized state. Likewise, the Ru-based catalyst tends to volatilize easily and therefore shows degraded catalytic activity in an oxidized state at high temperature.

Particularly during a shutdown period of the reformer, there is a possibility of air (oxygen) intruding therein from the outside of the equipment due to the depressurizing effect originating from the temperature decrease of a high-temperature remaining gas in the reformer, and there is an increasing concern over the deterioration of the reforming catalyst body by oxidation. Therefore, it is necessary to take a measure to inhibit oxidation of catalysts during a shutdown period of the reformer. For this purpose, the following method has been adopted; after ceasing maintaining the temperature of the reforming catalyst body at a high reforming temperature (at 700° C., for example), purging is performed in such a manner that an inert gas such as nitrogen is introduced into the interior of the reformer and the interior of the reformer is filled with nitrogen in order to replace the high-temperature remaining gas in the interior of the reformer; thereafter, the upstream and downstream of the reformer are closed by sealing valves to inhibit deterioration of the reforming catalyst body.

Another method in which a hydrogen generator is purged with a feed gas for the hydrogen generator itself in place of nitrogen has been proposed as remedies for the increased cost and complexity associated with obtaining nitrogen. (See, for example, Japanese Unexamined Patent Publication 2000-95504.) With this method, the interior of the reformer can be appropriately purged without using nitrogen after shutting down the reformer, and cost reduction and simplification of the gas supply system are made possible.

Although the foregoing publication does not mention post-processing of a combustible purge gas that is forced out by purging the reformer, a post-processing method normally assumed for effectively utilizing existing equipment is such that a purge gas is returned to a burner for heating the reforming catalyst body of the reformer and then combustion-treated with the burner.

When the interior of the reformer is purged with a feed gas, it is important to reduce the temperature of the reforming catalyst body as quickly as possible so as not to thermally decompose the feed gas and to complete the purging operation for the reformer within a minimum time, from the viewpoint of saving the energy required for the purging. Nevertheless, the above-described combustion of the purge gas in the burner functions to reduce the rate of the temperature decrease of the reforming catalyst body and thereby delays the purging of the reformer, leading to an increase in energy loss in the hydrogen generator. Moreover, if a purge gas that is useful as a power generation gas is burnt in the burner when purging the reformer, the amount of heat that is to be produced by this combustion cannot be utilized effectively, and effective utilization of energy cannot be attained.

SUMMARY OF THE INVENTION

The present invention has been accomplished in view of the foregoing circumstances, and it is an object of the present invention to provide a hydrogen generator in which, when the interior of the reformer is purged with a feed gas, a purge gas containing the feed gas or a reformed gas (combustible gas) can be post-processed efficiently by the burner of the reformer; it is also an object of the invention to provide a method of shutting down an operation of a hydrogen generator that is capable of stopping combustible gas combustion of the burner and efficiently post-processing a purge gas inside the burner; and further, it is an object of the invention to provide a fuel cell system that can efficiently utilize the purge gas in a fuel cell.

The present invention provides a hydrogen generator including: a reformer for generating a hydrogen-rich gas from a feed gas and water by a reaction using a reforming catalyst body and sending it out from an outlet port; a material feed system for feeding the feed gas to the reformer; a burner for supplying, to the reforming catalyst body, heat generated by mixing a fuel gas with air and burning it; and an air supply system for supplying air to the burner; wherein, when purging an interior of the reformer using the feed gas in shutting down the hydrogen generator, an amount of the air supplied is increased to put out a flame of the burner, and a purge gas sent out from the outlet port by the purging is mixed and diluted with the air in the burner and is discharged outside. Thus, the purge gas that has been purged and air are mixed in the interior of the burner, and post-processing of the purge gas can be carried out efficiently.

Specifically, the flame of the burner can be put out by diluting the concentration of a combustible gas within the mixed gas containing the purge gas and the air inside the burner to be less than a combustible concentration.

In addition, the burner may be provided with a combustion gas passage that passes a combustion gas generated by mixing a fuel gas with air and burning the mixture, for supplying heat to the reforming catalyst body by heat exchange, and the reforming catalyst body may be cooled by, after putting out the flame of the burner, passing the air that is supplied from the air supply system to the burner, through the combustion gas passage, utilizing heat exchange between the burner and the reforming catalyst body.

Here, after the concentration of the combustible gas in the mixed gas is diluted to be less than the combustible concentration, the mixed gas can be discharged to atmosphere, and therefore, the purge gas can be disposed of with the use of the existing burner.

In addition, the air may be supplied constantly from the air supply system to the burner during a period in which the purge gas is discharged to the burner; thereby, processing of the purge gas can be maintained without fail.

In addition, it is possible to provide a water supply system for supplying water to the reformer, and both the feed gas and the water may be supplied to the interior of the reformer during a period in which the temperature of the reforming catalyst body is at a predetermined temperature or higher, and only the feed gas may be supplied to the interior of the reformer after the temperature of the reforming catalyst body reaches the predetermined temperature. It should be noted that the predetermined means a higher one of the lower limit temperature at which the feed gas is thermally decomposed and the temperature at which steam condensation starts to occur.

In this way, a hydrogen-rich reformed gas can be generated by a reforming reaction of the reforming catalyst body in a temperature range higher than the predetermined temperature, making it possible to maintain the atmosphere surrounding the reforming catalyst body in a reduced state; moreover, supply of the water is stopped at the time when the predetermined temperature is reached, and therefore, steam condensation inside the reformer can be obviated.

When both the feed gas and the water are supplied to the interior of the reformer, a ratio of carbon in the feed gas with respect to steam generated from the water (steam-carbon ratio) may be 2 or greater. By keeping the steam-carbon ratio at 2 or greater, it is possible to avoid the problem of carbon deposition due to thermal decomposition of excessive feed gas arising from shortage of steam. Furthermore, an amount of the supplied feed gas on a molar basis may be greater than a dissolved oxygen amount contained in the steam on a molar basis. By making the amount of the supplied feed gas greater than the dissolved oxygen amount, the dissolved oxygen is completely used up by the reaction with the feed gas, and the cause of oxidation deterioration of the reforming catalyst body can be obviated.

After the temperature of the reforming catalyst body has reached the predetermined temperature, the feed gas may be supplied to the reformer in an amount that is 1 or more times the internal volume, but 10 or less times the internal volume, of the reformer. This makes it possible to reliably purge the steam from the interior of the reformer with the feed gas.

The present invention also provides a method of shutting down a hydrogen generator, the hydrogen generator provided with a reformer having a reforming catalyst body for generating a hydrogen-rich gas from a feed gas and water, and a burner for heating the reforming catalyst body heat-exchangeably, the method includes: when purging an interior of the reformer by supplying the feed gas to an interior of the reformer, putting out a flame of the burner by increasing an amount of air supplied to an interior of the burner.

The flame of the burner can be put out in this way, and the combustible gas can be post-processed by the burner efficiently. Specifically, by increasing the amount of the air supplied to the interior of the burner, the concentration of a combustible gas is diluted to be less than a combustible concentration, and thus, the burning of the combustible gas can be stopped.

In addition, after the concentration of the combustible gas has been diluted to be less than the combustible concentration, the combustible gas may be discharged to atmosphere. Therefore, the combustible gas can be post-processed utilizing the existing burner.

In addition, after putting out the flame of the burner, the temperature of the reforming catalyst body can be quickly reduced by continuously supplying the air to the burner utilizing the heat exchange effect between the burner and the reforming catalyst body.

The present invention further provides a fuel cell system including: a hydrogen generator such as described above, and a fuel cell for generating power using a hydrogen-rich gas supplied from the hydrogen generator through a reformed gas supply path, wherein, after putting out a flame of the burner, the hydrogen-rich gas is supplied to the fuel cell to cause an anode of the fuel cell to consume hydrogen in the hydrogen-rich gas. In this way, even after the flame of the burner has been put out, hydrogen can be reacted inside the fuel cell to continue the power generation, and wasteful disposal of hydrogen can be suppressed.

After putting out the flame of the burner, a hydrogen consumption rate, obtained by dividing a total amount of hydrogen consumed within the fuel cell by a total amount of hydrogen contained in the hydrogen-rich gas that flows through the reformed gas supply path, may be controlled based on a temperature of the reforming catalyst body. Specifically, the hydrogen consumption rate is increased according to a decrease in the temperature of the reforming catalyst body. Thus, a desired power generation amount is maintained, and the amount of wasted hydrogen can be reduced further since the proportion of hydrogen consumed increases.

The foregoing and other objects, features and advantages of the present invention will become more readily apparent from the following detailed description of preferred embodiments of the invention, with reference to the accompanying drawings.

DETAILED DESCRIPTION OF PREFERRED EMBODIMENTS

Hereinbelow, preferred embodiments of the present invention are described with reference to the drawings.

Embodiment 1

Figure 1:
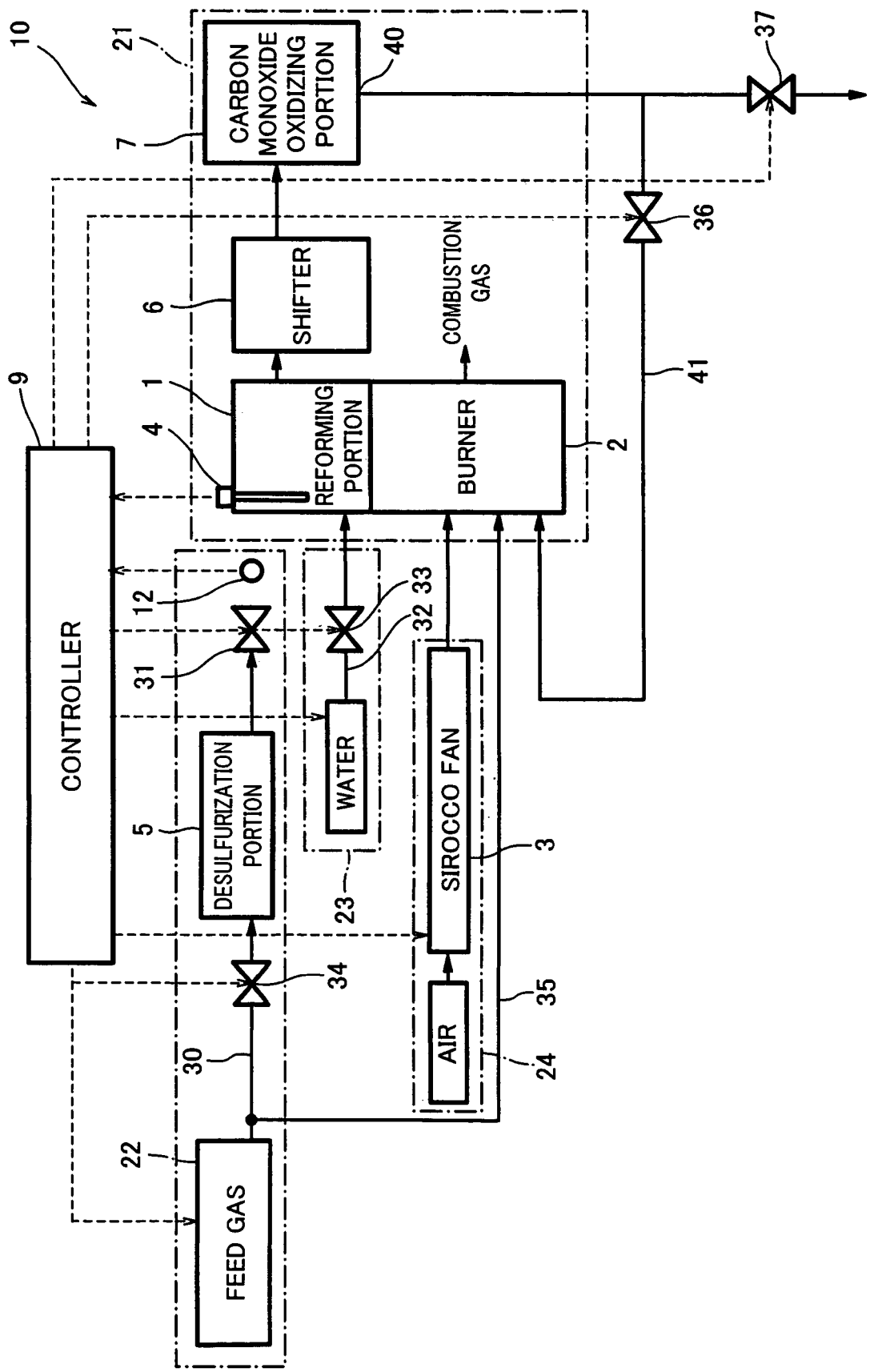
FIG. 1 is a schematic view showing the configuration and the gas supply system of a hydrogen generator according to Embodiment 1 of the present invention.

FIG. 1 is a schematic view showing the configuration and the gas supply system of a hydrogen generator according to Embodiment 1 of the present invention.

Referring to FIG. 1, a hydrogen generator 10 mainly comprises a controller 9, a reformer 21 for supplying a hydrogen-rich reformed gas, a material feed system 22 for feeding a feed gas to the reformer 21 in addition to adjusting a feed gas flow rate, a water supply system 23 for supplying water to the reformer 21 in addition to adjusting a water flow rate, and an air supply system 24 for supplying air to a burner 2 in addition to adjusting an air flow rate.

The reformer 21 is furnished with a reforming portion 1 for steam-reforming a feed gas and steam by a reforming catalyst body 74 (see FIG. 3), a burner 2 for supplying heat for a reforming reaction to the reforming catalyst body 74, a reforming temperature measuring portion 4 for detecting the temperature of the reforming catalyst body 74 of the reforming portion 1, a shifter 6 for reducing, by a shift catalyst body (not shown), the concentration of CO in the gas that is sent out from the reforming portion 1, and a carbon monoxide oxidizing portion 7 for further reducing, by a carbon monoxide oxidizing catalyst body (not shown), the concentration of CO in the gas that is sent out from the shifter 6.

The reforming catalyst body 74 used is that prepared in a pellet state by making a Ru-based catalyst carry alumina, the shift catalyst body used is that made into a honeycomb substrate by making a Ce oxide carry platinum, and the carbon monoxide oxidizing catalyst body used is that made into a honeycomb substrate by making alumina carry platinum. Examples of the feed gas include, but are not limited to, hydrocarbon-based gases such as natural gas or LPG, alcohols such as methanol, and naphtha components. In Embodiment 1, a natural gas containing methane gas as its main component is used; therefore, the material feed system 22 is provided with a desulfurization portion 5 that incorporates a zeolite adsorbent for removing a sulfur component contained in the natural gas.

The water supplied from the water supply system 23 is ion-exchanged and then supplied to the reforming portion 1. An evaporation system (not shown) for letting water evaporate may be installed either inside the reforming portion 1 or outside the reforming portion 1.

Here, when supplying the heat of reaction that is necessary for the reforming reaction in the reforming portion 1, it is possible to burn the feed gas with the burner 2 by supplying a part of the feed gas via a feed gas branching passage 35 to the burner 2, or alternatively, by returning a reformed gas emitted from a supply destination of the hydrogen-rich reformed gas (a fuel cell in the case of fuel cell power generation) via a return gas passage 41 to the burner 2, it is possible to burn the returned reformed gas. Additionally, in order to introduce air into the burner 2 so that the air is burnt together with the feed gas and the reformed gas, an air supply system 24 for supplying air is coupled to the burner 2. The air supply system 24 is provided with, for example, a sirocco fan 3.

In addition, as input sections for the controller 9, there are provided a reforming temperature measuring portion 4 and a feed gas flow rate meter 12, and as output sections for the controller 9, there are provided a feed gas flow rate control portion (not shown) of the material feed system 22, first and second feed gas supply valves 31 and 34 for supplying a feed gas, which are disposed so as to sandwich the desulfurization portion 5, a water flow rate adjusting portion (not shown) of the water supply system 23, a water supply valve 33 for supplying water, an air flow rate-adjusting portion (not shown) of the air supply system 24, first and second open/close valves 36 and 37, and so forth.

It should be noted that a hydrogen-rich reformed gas produced by such a hydrogen generator 10 is utilized for, for example, a fuel cell system that uses hydrogen as its fuel.

Next, gas supply operations of the hydrogen generator 10 in a normal operation and in an operation shutdown are explained. The description of the procedure for the operation shutdown of the hydrogen generator 10 discusses a purging operation of the interior of the reformer 21 with a feed gas and a post-processing operation of the purge gas discharged outside the reformer 21 separately.

First, a gas supply operation of the hydrogen generator 10 in a normal operation is described.

The controller 9 opens the first and second feed gas supply valves 31 and 34, disposed sandwiching the desulfurization portion 5 in the midstream of the feed gas supply path 30 of the material feed system 22, to supply a natural gas to the reforming portion 1 of the reformer 21. At this time, an odorant component (sulfur component) in the natural gas, being a poisonous component for the catalyst of the hydrogen generator 10, is removed by a zeolite adsorbent incorporated in the desulfurization portion 5 that is upstream of the reformer 21 so that molecules of the sulfur component in the feed gas are reduced to $1/100,000,000$ of the total mole number of feed gas molecules. Here, the first feed gas supply valve 31 is an open/close valve for controlling whether or not to supply the feed gas, and the second feed gas supply valve 34 is an open/close valve for inhibiting the desulfurization portion 5 from being left open when stopping the material feed system 22.

Meanwhile, at the same time as the supplying of the feed gas, the controller 9 opens the water supply valve 33 disposed in midstream of the water supply path 32 to supply the ion-exchanged water to the reforming portion 1. Note that the balance of amounts between the natural gas and the water supplied is adjusted so that the supplied water amount is about 3 times the number of elemental carbon contained in the natural gas.

Further, a portion of the feed gas is sent to the burner 2 through the feed gas branching passage 35 and burnt inside the burner 2; thereby, the reforming catalyst body 74 (see FIG. 3) receives a necessary amount of generated heat for the reforming reaction, and a hydrogen-rich reformed gas is generated in the reforming portion 1 from the feed gas and the water of the reforming portion 1 in a state in which the temperature of the reforming catalyst body 74 is kept at about 700° C.

The controller 9 monitors the temperature detected by the reforming temperature measuring portion 4 and keeps track of the status of the reforming reaction. Based on the detected temperature, it controls the feed gas flow rate adjusting portion of the material feed system 22 and the first feed gas supply valve 31 as well as the water flow rate adjusting portion of the water supply system 23 and the water supply valve 33 so that predetermined amounts of feed gas and water can be supplied.

On the other hand, the reformed gas generated by the reforming portion 1 contains about 10% (on a dry gas basis) of a carbon monoxide gas and a carbon dioxide gas, and therefore, when it is used for a fuel cell, it is necessary to reduce the carbon monoxide gas concentration to a level that does not poison the anode catalyst of the fuel cell. For this purpose, after flowing through the shifter 6, this reformed gas is sent to the carbon monoxide oxidizing portion 7 along with a trace amount of oxygen gas. In the shifter 6, the temperature of the shift catalyst body is kept at about 250° C. to cause the steam and the carbon monoxide gas to form hydrogen and carbon dioxide gas by a shift reaction, and thereby, the carbon monoxide gas concentration of the reformed gas after the shift reaction is reduced to about 0.5% and the carbon dioxide gas concentration to 19.5% (on a dry gas basis). In the carbon monoxide oxidizing portion 7, the temperature of the carbon monoxide oxidizing catalyst body is kept at about 120° C. to 160° C. to cause the carbon monoxide gas in the reformed gas to react with an oxygen gas with this catalyst body, and thus, the concentration of carbon monoxide is reduced to 10 ppm. In this way, the reformed gas inside the reformer 21 is made into a condition in which impurities are removed therefrom so that it can withstand the use for a fuel cell or the like.

Next, the following describes an operation of a gas supply system in which an interior of the reformer 21 is purged with a feed gas after shifting from a normal operation to an operation shutdown procedure. Here, the purging gas supplied to the reformer 21 is changed when a predetermined temperature is reached in the reforming catalyst body 74 of the reforming portion 1, and therefore, how the gas control is performed and why such a control is performed are described for each of the respective cases where the temperature is above and below the predetermined temperature. The predetermined temperature indicates a lower limit temperature at which carbon deposition can occur by thermal decomposing a feed gas, but regardless of the carbon deposition temperature, the predetermined temperature does not become lower than the temperature at which steam condensation starts to occur (100° C. or lower). That is, the predetermined temperature denotes a higher one of the lower limit temperature at which carbon deposition can occur by thermal decomposition of a feed gas and the temperature at which steam condensation starts to occur. For example, the temperature range of carbon deposition of natural gas by thermal decomposition is about 400° C. or higher, while the temperatures range of steam condensation is about 100° C. or lower. Accordingly, in the case of using a natural gas, the predetermined temperature is about 400° C. It should be noted that the controller 9 detects the temperature of the reforming catalyst body 74 with the reforming temperature measuring portion 4, which is installed in the reforming portion 1 shown in FIG. 1, and constantly monitors whether or not the detected temperature has reached the predetermined temperature.

At the time immediately after the heating by the burner 2 for maintaining the reforming temperature of the reforming catalyst body 74 is stopped (immediately after the flame of the burner is put out), the temperature of the reforming catalyst body 74 of the reforming portion 1 has been elevated to about 700° C. Both the feed gas and water are sent into the reforming portion 1 during a period in which the reforming catalyst body 74 of the reforming portion 1 is cooled to the predetermined temperature (400° C. in the case of natural gas, which is the lower limit temperature at which carbon deposition occurs by thermal decomposition) from the elevated temperature (in other words, during a period in which the temperature of the reforming catalyst body 74 is at a predetermined temperature or higher) by later-described heat exchange between the reforming catalyst body 74 and the burner 2. This makes it possible to generate a hydrogen-rich reformed gas by the reforming reaction of the reforming catalyst body 74 and to maintain the internal atmosphere of the reforming portion 1 to be in a reduced state. As a consequence, the interior of the reforming portion 1 is prevented from turning into an oxidizing atmosphere and the activity of the reforming catalyst body 74 can be maintained. At the same time, the reforming reaction between the feed gas and steam is prioritized and the carbon deposition due to thermal decomposition of the feed gas can be inhibited, making it possible to cool the temperature of the reforming catalyst body 74 without damaging the reforming catalyst body 74. Moreover, because the inclusion of the feed gas and water causes the steam reforming, which is an endothermic reaction, to proceed, an accompanying effect occurs that the reaction serves to remove heat from the reforming catalyst body 74, reducing the temperature of the reforming catalyst body 74 more quickly.

In the case where both the feed gas and steam are supplied to the reforming catalyst body 74, that is, in the case where the reforming catalyst body 74 is at the above-noted predetermined temperature or higher, it is necessary to make the amount of the feed gas supplied greater than the amount of dissolved oxygen contained in water on a molar basis and to keep a ratio S/C of carbon in the feed gas with respect to steam (steam-carbon ratio) at 2 or greater for the following reason.

Water contains a trace amount of oxygen gas dissolved therein, and even the trace amount of oxygen gas can promote catalyst deterioration by oxidation at a higher temperature than the temperature at which the reforming catalyst body 74 can be readily oxidized (300° C. or higher with Ru-based catalyst). Nevertheless, dissolved oxygen contained in water tends to react with a feed gas more readily rather than with the reforming catalyst body 74 (Ru-based catalyst); therefore, if the feed gas is supplied at an amount greater than the amount of dissolved oxygen contained in water (on a molar basis), the dissolved oxygen is completely used up by the reaction with the feed gas. Thus, the cause of oxidation deterioration of the reforming catalyst body 74 can be eliminated.

On the other hand, S/C denotes the ratio of carbon component in the feed gas and steam used for the reforming reaction, and when S/C<2, shortage of steam required for the reaction occurs because the equivalence ratio for the reaction is S/C=2. If S/C<2 when the temperature of the reforming catalyst body 74 is higher than the thermal decomposition temperature of the feed gas under this circumstance, carbon deposition occurs due to thermal decomposition of excessive feed gas because of the shortage of steam, which is undesirable.

Then, a temperature decrease of the reforming catalyst body 74 of the reforming portion 1 proceeds, and at the time when the temperature detected by the reforming temperature measuring portion 4 reaches the above-noted predetermined temperature, the controller 9 performs a control to close the water supply valve 33 so as to stop supplying water, followed by the purging of the reformer 21 only with the feed gas.

In this way, in a temperature range (about 400° C. in the case of the present embodiment) that is sufficiently higher than the steam condensation temperature (about 100° C.), the steam inside the reformer 21 can be removed in advance with a feed gas, eliminating steam condensation inside the reformer 21 fundamentally. If the steam could not be completely eliminated with a feed gas, steam condensation would occur inside the reformer 21 at the time when the temperature of the reformer 21 becomes lower than the steam condensation temperature; thus, not only would the condensed water inhibit quick heating of the reformer 21 in restarting the reformer 21, prolonging the start-up time of the reformer 21 unduly but also might deteriorate the characteristics of the reforming catalyst body 74, the shift catalyst body, and the carbon monoxide oxidizing catalyst body inside the reformer 21.

In order to completely purge steam from the interior of the reformer 21 with a feed gas, the amount of the feed gas to be supplied needs to be at least equal to or greater than the internal volume of the reformer 21 (1 or more times the internal volume of the reformer), desirably two or more times the internal volume of the reformer 21. For example, when the internal volume of the reformer 21 is 1 L, the feed gas is made to flow in the reformer 21 in an amount of 2 L (two times of the internal volume) so that the atmosphere inside the reformer 21 can be purged completely. What is important is the total flow rate of the feed gas; the flow rate of the feed gas may be 1 L/minute and the purging time may be 2 minutes, or the flow rate of the feed gas may be 2 L/minute and the purging time may be 1 minute.

However, the amount of feed gas is necessary and sufficient as long as the steam atmosphere inside the reformer 21 can be purged completely; rather, it is desirable to minimize the amount of the feed gas used for discharging steam from the viewpoint of saving the consumed energy amount required for the shutdown operation, so the amount of the feed gas supplied is restricted to at most 10 or less times the internal volume of the reformer 21. It should be noted that the controller 9 monitors the feed gas flow rate meter 12 disposed in the midstream of the feed gas supply path 30 between the first feed gas supply valve 31 and the reforming portion 1, and the total amount of the supplied feed gas is controlled at a desired amount based on the detected signal from the flow rate meter 12.

Thus, the interior of the reformer 21 can be appropriately purged from the time immediately after the shutdown of the reformer 21 without deteriorating catalysts inside the reformer 21 by oxidation.

Next, the following describes a post-processing operation of the purge gas discharged from the reformer.

Conventionally, there is a means for post-processing a combustible purge gas (a hydrogen-rich reformed gas or a feed gas) after discharging, which has a burner by which the purge gas is combustion-treated and discharged to the downstream of the reformer 21. With this method, however, energy loss occurs in the case of using the existing burner for heating the reforming catalyst body 74 since the temperature decrease of the reforming catalyst body 74 is inhibited, or additional cost arises in the case of providing an additional burner.

In view of this, in Embodiment 1, an outlet port 40 of the reformer 21 (more specifically, an outlet port 40 provided in the carbon monoxide oxidizing portion) is coupled to the existing burner 2 so that a post-purging feed gas (which may be a hydrogen-rich reformed gas originating from a reforming reaction, depending on the temperature condition of the reforming catalyst body 74, but hereafter, they are collectively referred to as a "feed gas" in the description of the purge gas post-processing system) that has completed the purging of the interior of the reformer 21 can be returned through the return gas passage 41 to the burner 2; in addition, at the time when the interior of the reformer 21 is purged with the feed gas and steam, the number of revolutions of the sirocco fan 3 of the air supply system 24 is increased to be greater than that during a normal operation to send air into the burner 2 in excess. In this way, the post-purging feed gas and the air are mixed within the burner 2, and the concentration of combustible gas in the mixed gas is diluted to be less than a combustible concentration. As a result, a flame of the burner 2 is put out, and the mixed gas is discharged to atmosphere.

Although not shown in the drawings, a water removing system is disposed at an appropriate position in the return gas passage 41, and thereby, water content (minute water drops or steam) contained in the purge gas that has purged the interior of the reformer 21 and is introduced into the burner 2, is appropriately removed. Even if the water content is not completely removed by the water removing system and flows into the burner 2 accompanying the purge gas, such water content is effectively discharged outside by sending air into the burner 2 in excess with the sirocco fan 3, which is desirable.

By adopting such a configuration in the purge gas post-processing system, advantageous effects as follows are exhibited.

The first advantageous effect is as follows. The burner 2 is originally intended to heat the reforming catalyst body 74 and therefore is designed to efficiently perform heat exchange therebetween. Consequently, making use of this function, the air introduced from the air supply system 24 can have the function of promoting the cooling of the reforming catalyst body 74 in addition to the function of diluting a combustible gas. In other words, the introduction of air into the burner 2 that can effectively perform heat exchange with the reforming catalyst body 74 in an amount greater than the amount of the air supplied during a normal operation has an advantageous effect of, not heating the reforming catalyst body 74, but quickly cooling the temperature of the reforming catalyst body 74 to a temperature at which oxidation deterioration or carbon deposition of the feed gas does not occur.

Figure 2:
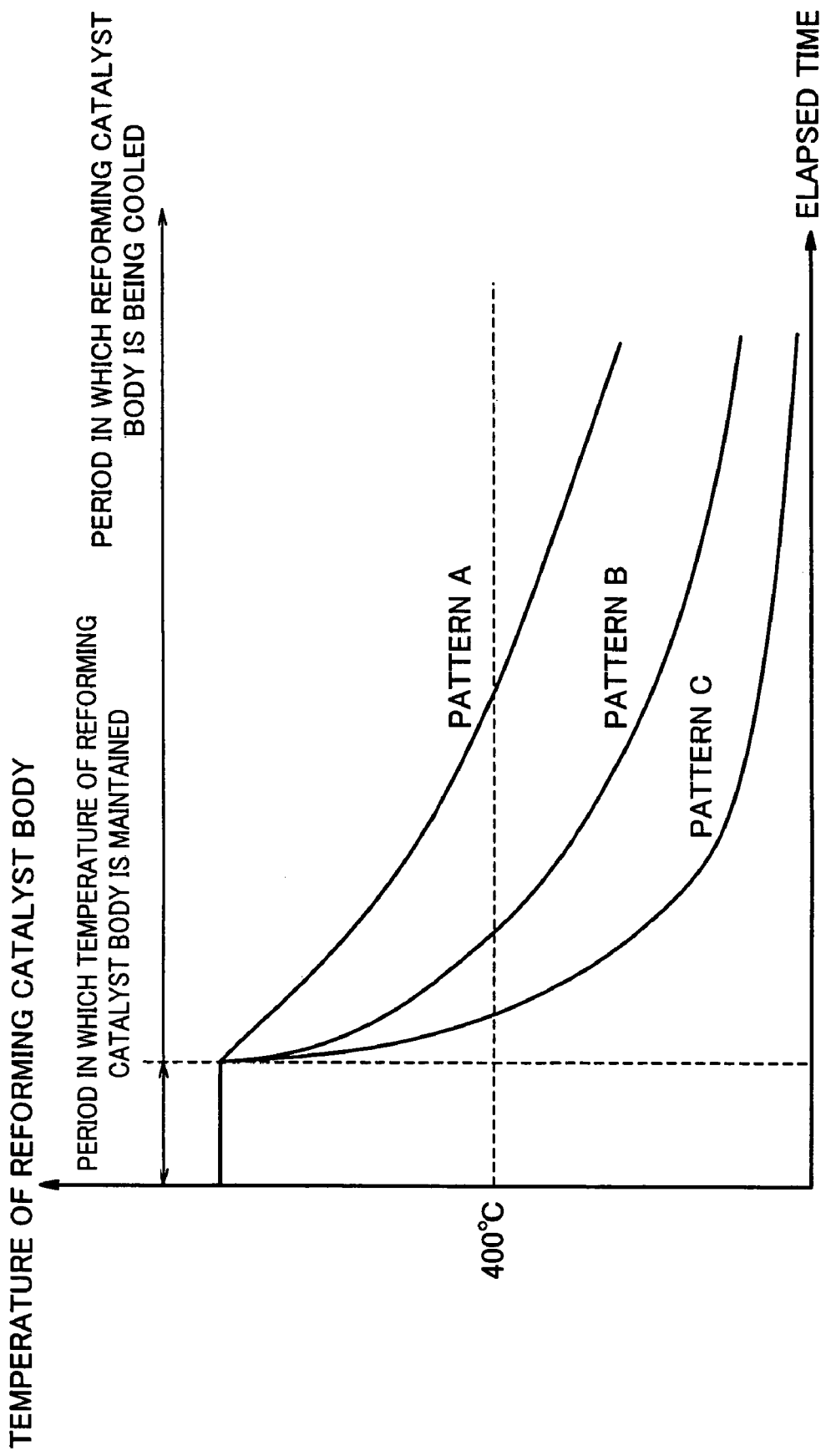
FIG. 2 is a graph for illustrating by comparing changes over time of the degree of cooling of a reforming catalyst body with varying gas supply conditions such as feed gas return to a burner and air introduction to the burner.

In FIG. 2, changes over time of the degree of cooling of the reforming catalyst body 74 after stopping the heating by the burner 2 for maintaining the reforming temperature of the reforming catalyst body 74 are compared under various burner gas supply conditions, the conditions of the return of post-purging feed gas and the introduction of air to the burner. Pattern A in FIG. 2 represents an example of the decrease in the temperature of the reforming catalyst body in the case where neither the return of a feed gas to the burner 21 nor the introduction of air by the air supply system 24 to the burner 21 is performed, no particular action is taken, and the burner 2 is left as it is. Pattern B represents an example of the decrease in the temperature of the reforming catalyst body in the case where: the reformer 21 is purged with a feed gas and steam until the temperature of the reforming catalyst body 74 reaches 400° C. and with only the feed gas after the temperature has reached 400° C.; and the post-purging purge gas is returned through the return gas passage 41 to the burner 21 but the introduction of air from the air supply system 24 is not performed. Further, Pattern C represents an example of the decrease in the temperature of the reforming catalyst body in the case where: the reformer 21 is purged with a feed gas and steam until the temperature of the reforming catalyst body 74 reaches 400° C. and with only the feed gas after the temperature reaches 400° C.; and both the return of the post-purging purge gas through the return gas passage 41 to the burner 21 and the introduction of air from the air supply system 24 to burner 2 are performed.

As clearly seen from FIG. 2, Pattern c shows that the temperature of the reforming catalyst body 74 dropped over time most quickly. This proves the advantageous effect according to the configuration of Embodiment 1 that cooling can be promoted utilizing the heat exchange between the burner 2 and the reforming catalyst body 74. It should be noted that Pattern b shows a superior cooling effect on the reforming catalyst body 74 than that of Pattern a. This indicates that it is possible to promote cooling of the reforming catalyst body 74 through the heat exchange between the reforming catalyst body 74 and the burner 2 even with only the return of the purge gas for the reformer 21.

The second advantageous effect is as follows. In a normal operation, while the flame of the burner 2 is burning to heat the reforming catalyst body 74 of the reforming portion 1, the flame can be put out (the combustion of combustible gas can be stopped) by increasing the output power (number of revolutions) of the sirocco fan 3 of the air supply system 24 according to the supply of a combustible purge gas to the reformer 21 so that a large amount of air is introduced at a time and the concentration of the combustible gas is diluted to be less than a predetermined combustible concentration.

If the combustible gas is hydrogen gas, the combustible dilution limit concentration is 4% and the combustible condensation limit concentration is 75%. Accordingly, in order to dilute the concentration of hydrogen to be less than the combustible concentration, it is necessary to increase the number of revolutions of the sirocco fan 3 to increase the supplied air amount from the fan to the burner 2 so that the hydrogen concentration becomes less than 4%.

On the other hand, if the combustible gas is methane gas, the combustible dilution limit concentration is 5% while the combustible condensation limit concentration is 15%. Accordingly, in order to dilute the concentration of methane gas to be less than the combustible concentration, it is necessary to increase the number of revolutions of the sirocco fan 3 to increase the supplied air amount from the fan to the burner 2 so that the methane gas concentration becomes less than 5%.

The amount of the supplied feed gas that is returned to the burner 2 and the amount of the supplied air introduced to the burner 2 are both controlled by the controller 9 so that the combustible gas in the feed gas is reliably diluted to have a concentration less than the combustible concentration, and thus, the flame of the burner 2 can be put out. This makes it possible to reliably shift, in the burner 2, a heated state for maintaining the reforming temperature of the reforming catalyst body 74 to a diluted and diffused state of the feed gas and a cooled state of the reforming catalyst body 74.

Figure 3:
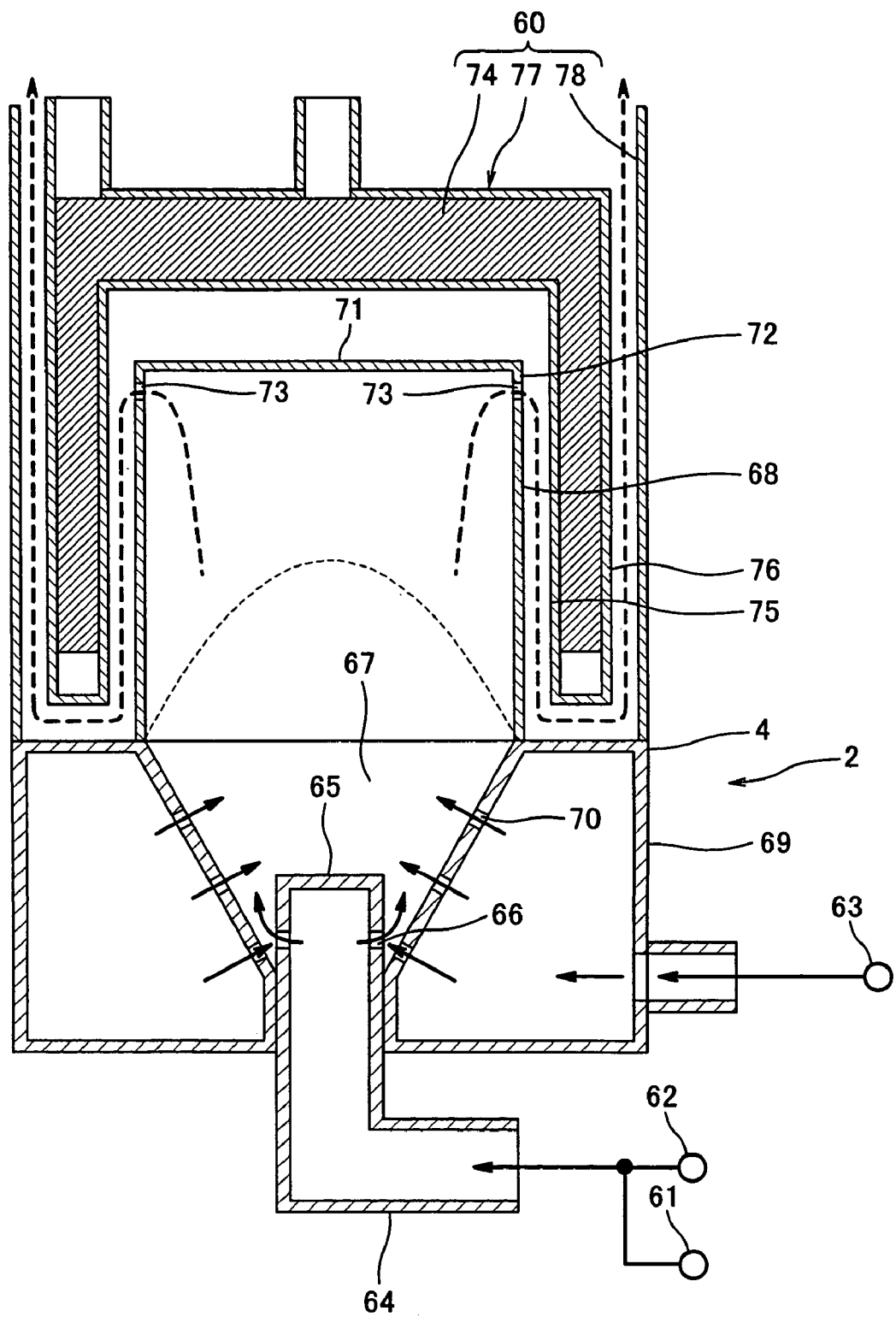
FIG. 3 is a cross-sectional view showing a burner and the periphery of a reforming catalyst body neighboring burner's combustion cylinder.

Here, the effect of putting out a flame with air dilution of the feed gas and the mechanism of causing cooling promotion of the reforming catalyst body 74 with the burner are detailed with reference to the cross-sectional view of the burner and the peripheral structure of the reforming catalyst body neighboring the combustion cylinder of the burner, shown in FIG. 3. FIG. 3 shows a cross section of the burner 2, which mainly comprises a combustion cylinder 68, a combustible gas pipe 64, and an air buffer 69; and a peripheral structure 60 of the reforming catalyst body 74, which mainly comprises the reforming catalyst body 74, an enclosure case 77 for enclosing the reforming catalyst body 74, and an outer wall 78.

First, the mechanism of heating the reforming catalyst body 74 by burning a mixed gas containing a feed gas and combustion air with the burner 2 is described, and subsequently, the mechanism of putting out a flame of the burner 2 and cooling the reforming catalyst body 74 is described.

A feed gas supplied from a feed gas inlet port 62 of the burner 2, which is connected to the feed gas branching passage 35 (see FIG. 1), and/or a reformed gas supplied from a return gas inlet port 61 of the burner 2, which is connected to the return gas passage 41 (see FIG. 1), is/are introduced to a tubular-shaped combustible gas pipe 64.

Then, the feed gas or the reformed gas (hereafter collectively referred to as "feed gas" in the description referring to FIG. 3), the direction of which is turned about 90° within the tubular-shaped combustible gas pipe 64, is guided toward the direction of the combustion cylinder 68. Subsequently, the stream of the feed gas is blocked at a time by a gas pipe lid 65 that seals the downstream end of the combustible gas pipe 64 and is split into a plurality of streams by feed gas blow holes 66 provided on the side face of the combustible gas pipe 64 in the vicinity of the gas pipe lid 65, and the feed gas is discharged in an inward direction of the combustion cylinder 68.

Meanwhile, combustion air supplied from an air inlet port 63, which is connected to the sirocco fan 3 of the air supply system 24 (see FIG. 1), is introduced to an air buffer 69 provided around the tubular-shaped combustible gas pipe 64 in a circular shape. The air stream of the air buffer 69 is split into a plurality of streams by air blow holes 70 formed in the inclined surface of the recessed portion in a reversed corn shape and discharged in an inward direction of the combustion cylinder 68.

The mixed gas containing the feed gas and the air thus introduced in an inward direction of the combustion cylinder 68 is burnt in a flame region 67 formed in the recessed portion of the burner 2 with the amounts thereof being controlled by the controller 9 so that the concentration of combustible gas in the feed gas falls within the combustible concentration range (for example, in the case of hydrogen gas, the concentration is kept within the range of from 4% to 75%). A high-temperature combustion gas generated by the combustion is passed through the interior of the burner 2, as indicated by dotted lines in FIG. 3.

That is, the combustion gas goes up within the combustion cylinder 68, and the rise is blocked at a combustion cylinder lid 71 provided at the upper end of the combustion cylinder 68. The stream of the combustion gas is split into a plurality of streams by combustion gas blow holes 73 formed in a side wall 72 of the combustion cylinder 68 near the combustion cylinder lid 71, and discharged outside the combustion cylinder 68.

The combustion gas discharged outside the combustion cylinder 68 is passed through a space between a first wall 75 of the reforming catalyst body 74's enclosure case 77 for enclosing the reforming catalyst body 74 and the side wall 72 of the combustion cylinder 68, and is lowered in the opposite direction to the above-mentioned rising direction of the combustion gas. Thereafter, the direction of the streams is changed about 180° in the vicinity of the flame region 67. Then, the combustion gas is guided upward through the space between the second wall 76 of the enclosure case 77 and an outer wall 78, and is discharged as an exhaust gas into atmosphere. While going up and down in substantially vertical directions, the high-temperature combustion gas makes contact with the reforming catalyst body 74 through the first and second walls 75 and 76 of the enclosure case 77 all the time. As a result, the reforming catalyst body 74 can receive the heat amount of the combustion gas efficiently, elevating its temperature to the catalyst reaction temperature (about 700° C.) smoothly.

Thus, the peripheral structure 60 of the reforming catalyst body 74 is designed so that heat exchange can easily take place between the reforming catalyst body 74 and the high-temperature gas that flows so as to come into contact with the enclosure case 77.

On the other hand, when cooling the reforming catalyst body 74 the temperature of which has been elevated to a high temperature by the burner 2, the heat accumulated in the reforming catalyst body 74 is removed therefrom by the mixed gas containing the feed gas and air in the following manner. It should be noted that the method of introducing the feed gas and air to the burner 2 is the same as that used when the burner 2 is used as a heater, and therefore, the description thereof is omitted.

The amounts of the feed gas and air supplied are controlled by the controller 9 so that the concentration of the combustible gas becomes less than the combustible concentration (for example, so that the gas concentration becomes less than 4% in the case of hydrogen gas) in the flame region 67. In this case, for example, the output power of the sirocco fan 3 is increased to be greater than that in the case of burning the combustible gas within the burner 2 so as to introduce air to the burner 2 in excess and to increase the amount of the air supplied to the flame region 67 of the burner 2; thus, it becomes possible to dilute the concentration of the combustible gas in the flame region 67 of the burner 2 and to put out the flame (stop the combustion of the combustible gas).

In the manner as described above, it becomes possible to dilute the concentration of the combustible gas in the mixed gas containing air and the feed gas within the flame region 67 to be less than the combustible concentration and to put out the flame by supplying air in excess; thus, the burner 2 can be smoothly shifted from a combustible gas burning state to a combustible-gas burning shutoff state.

After putting out the flame, the mixed gas containing the feed gas and air introduced into the combustion cylinder 68 flows inside the burner 2 in a similar manner to the combustion gas, as indicated by dotted lines in FIG. 3. Specifically, the mixed gas is not burnt inside the combustion cylinder 68 but goes up in the interior of the combustion cylinder 68, and the rise is blocked at the combustion cylinder lid 71 provided at the upper end of the combustion cylinder 68. The stream of the mixed gas is split into a plurality of streams by the combustion gas blow holes 73 formed in the side wall 72 of the combustion cylinder 68 near the combustion cylinder lid 71, and is discharged outside the combustion cylinder 68.

The mixed gas discharged out of the combustion cylinder 68 is lowered in the opposite direction to the above-mentioned gas rising direction through the space between the first wall 75 of the reforming catalyst body 74's enclosure case 77 that encloses the reforming catalyst body 74 and the side wall 72 of the combustion cylinder 68. Thereafter, the direction of the mixed gas stream is changed about 180° in the vicinity of the lower end of the combustion cylinder 68, then the mixed gas is guided upward through the space between the second wall 76 of the enclosure case 77 and the outer wall 78, passing through the same route as the discharge route of the combustion gas (the combustion gas route indicated by dotted lines in the figure), and is discharged to atmosphere.

While going up and down in substantially vertical directions, the mixed gas makes contact with the reforming catalyst body 74, the temperature of which has been elevated to about 700° C. for maintaining the reforming temperature, through the first and second walls 75 and 76 of the enclosure case, and performs heat exchange therewith. As a consequence, the mixed gas removes heat from the reforming catalyst body 74 efficiently, making it possible to smoothly reduce the temperature of the reforming catalyst body 74.

The third advantageous effect is as follows. As described with FIG. 3, the existing burner 2 and the existing air supply system can be effectively utilized in diluting the concentration of the combustible gas in the purge gas to be less than the combustible concentration in the flame region 67 of the burner 2 and discharging it to atmosphere, and therefore, an increase in manufacturing cost arising from upgrading equipment or the like is prevented.

Thus, with the existing burner 2, the amount of the feed gas supplied from the material feed system 22 to the reformer 21 (the amount corresponding to the purge gas amount) and the amount of the air supplied from the air supply system 24 (sirocco fan 3) to the burner 2 are appropriately controlled by the controller 9. Thereby, the concentration of the combustible gas in the mixed gas containing the purge gas (feed gas or reformed gas) and air can be diluted to be less than the combustible concentration within the burner 2 and discharged to atmosphere. Further, a flame is put out by diluting the concentration of the combustible gas to be less than the combustible concentration, and the temperature of the reforming catalyst body 74 can be quickly lowered by the mixed gas to a temperature such that deterioration by oxidation or carbon deposition of the feed gas does not occur.

Figure 4:
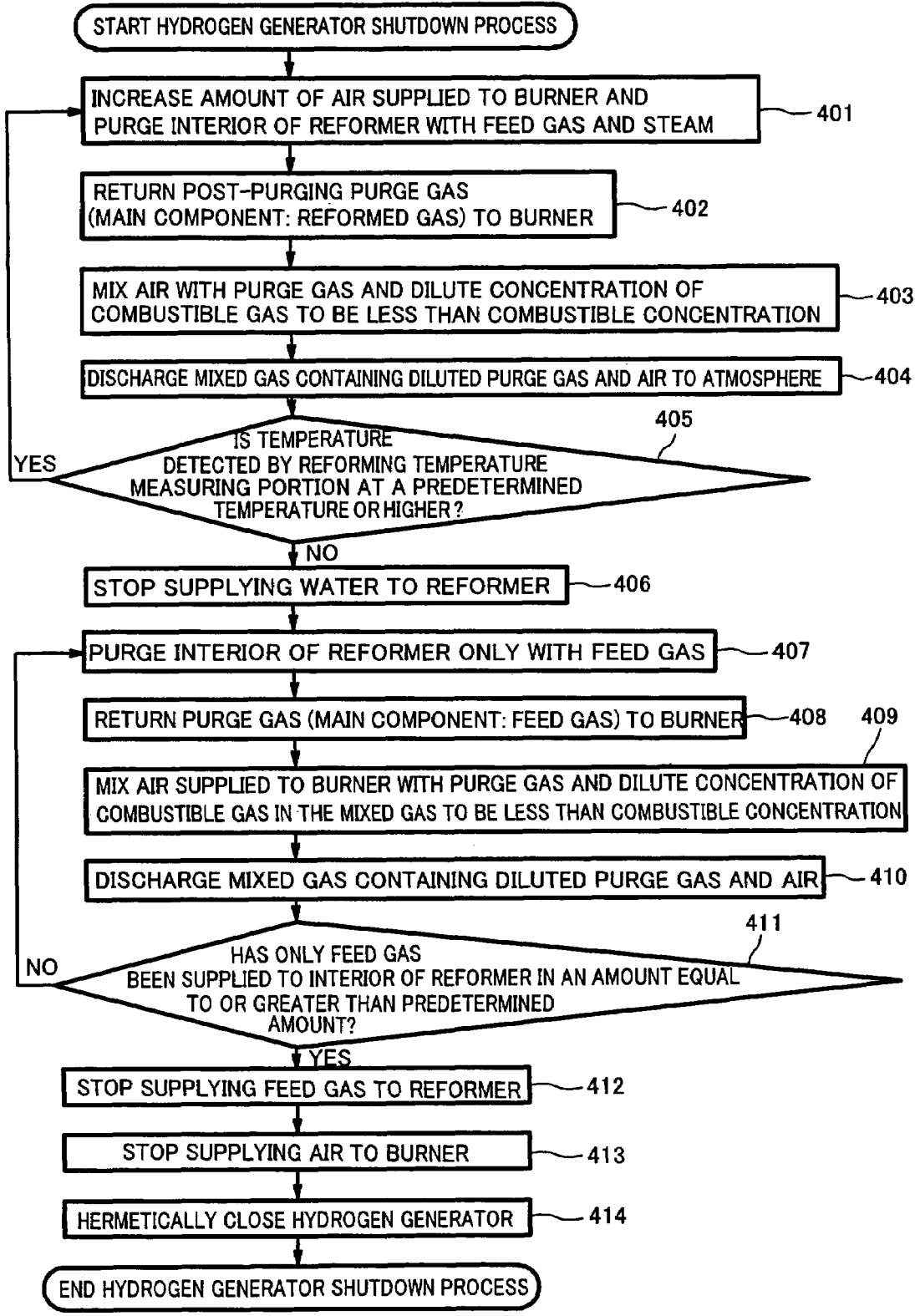
FIG. 4 is a flowchart illustrating an example of a series of process operations in an operation shutdown procedure for the hydrogen generator.

Here, an example of a series of process operations in the operation shutdown procedure for the hydrogen generator described above is described in chronological order with reference to the flowchart of FIG. 4.

FIG. 4, which shows steps S401 to S414, is a flowchart illustrating an example of the process operation from stopping the heating by the burner 2 (putting out a flame of the burner 2) for maintaining the reforming temperature of the reforming catalyst body 74 to hermetical closing of the hydrogen generator 10. FIG. 4 shows the content of the processes executed by the controller 9 when shutting down the hydrogen generator 10.

In order to stop heating the reforming catalyst body 74, the controller 9 raises the output power of the sirocco fan 3 to increase the amount of the air supplied to the burner 2. Meanwhile, a feed gas is supplied from the material feed system 22 through the desulfurizer 5 to the interior of the reformer 21 and steam is also supplied from the water supply system 23 to the interior of the reformer 21; with these gases, the interior of the reformer 21 is purged (step S401). The post-purging purge gas (containing hydrogen and steam-containing reformed gas as its main components) is discharged from the outlet port 40 of the reformer 21 and is returned to the burner 2 (step S402). Then, the purge gas that has been returned to the burner 2 and the air supplied in excess are mixed together and the concentration of combustible gas is diluted to be less than the combustible concentration (step S403).

Subsequently, the mixed gas containing the diluted purge gas and air is discharged to atmosphere (step S404). During the period in which the purge gas is returned to the burner 2 through the return gas passage 41, air is constantly kept supplied from the sirocco fan 3 of the air supply system 24 to the burner 2.

Here, during the period in which the feed gas and steam are supplied to the reformer 21, the controller 9 detects the temperature of the reforming catalyst body 74 with the reforming temperature measuring portion 4 and determines whether or not the detected temperature is at a predetermined temperature or higher (step S405). The predetermined temperature denotes a higher one of the lower limit temperature at which carbon deposition occurs by thermally decomposing the feed gas and the temperature at which steam condensation starts to occur. If the temperature detected by the reforming temperature measuring portion 4 is at the predetermined temperature or higher (if yes in step S405), the contiguous purging operation of steps S401 to S404 is continued. At the time when the temperature detected by the reforming temperature measuring portion 4 has become lower than the predetermined temperature (if no in step S405), the process proceeds to the next step, and the controller 9 controls the water supply system 23 to stop supplying water (step S406).

Thereafter, the controller 9 allows the purging of the interior of the reformer 21 only with the feed gas (step S407). The post-purging purge gas (main component: feed gas) is returned to the burner 2 (step S408), and the purge gas is mixed with excessive air that is sent from the sirocco fan 3 to the burner 2 to dilute the concentration of the combustible gas in the mixed gas to be less than the combustible concentration (step S409). Then, the mixed gas containing the diluted purge gas and air is discharged to atmosphere (step S410). During the period in which the purge gas is returned to the burner 2 through the return gas passage 41, air is constantly supplied from the sirocco fan 3 of the air supply system 24 to the burner 2.

Here, during the period in which only the feed gas is supplied to the interior of the reformer 21, the controller 9 monitors the total amount of the supplied feed gas with the feed gas flow rate meter 12 (see FIG. 1) and determines whether or not the feed gas has been supplied to the reformer 21 in an amount equal to or greater than a predetermined amount (step S411). The set value of the predetermined amount should be at least equal to or greater than the internal volume of the reformer 21, desirably 2-3 or more times the internal volume thereof. Until the supply of the feed gas reaches the predetermined amount (if no in step S411), the contiguous purging operation from step S407 to step S410 is continued. At the time when the supply of the feed gas has reached the predetermined amount (if yes in step S411), the process proceeds to the next step, and the controller 9 controls the material feed system 22 to stop supplying the feed gas to the reformer 21 (step S412).

After stopping the feed gas supply, the controller 9 stops the operation of the sirocco fan 3 to halt the air supply to the burner 2 (step S413). Then, the first and second feed gas supply valves 31, 34, the water supply valve 33, and the first and second open/close valves 36, 37 are closed, and the hydrogen generator 10 is hermetically closed (step S409) to end the operation shutdown procedure of the hydrogen generator 10.

With the operation shutdown procedure of the hydrogen generator 10, the interior of the reformer 21 can be purged with a feed gas, and the post-purging feed gas and/or reformed gas can be efficiently processed by diluting the gas(es) within the burner 2; moreover, cooling of the burner 2 can be performed quickly.

Embodiment 2

Figure 5:
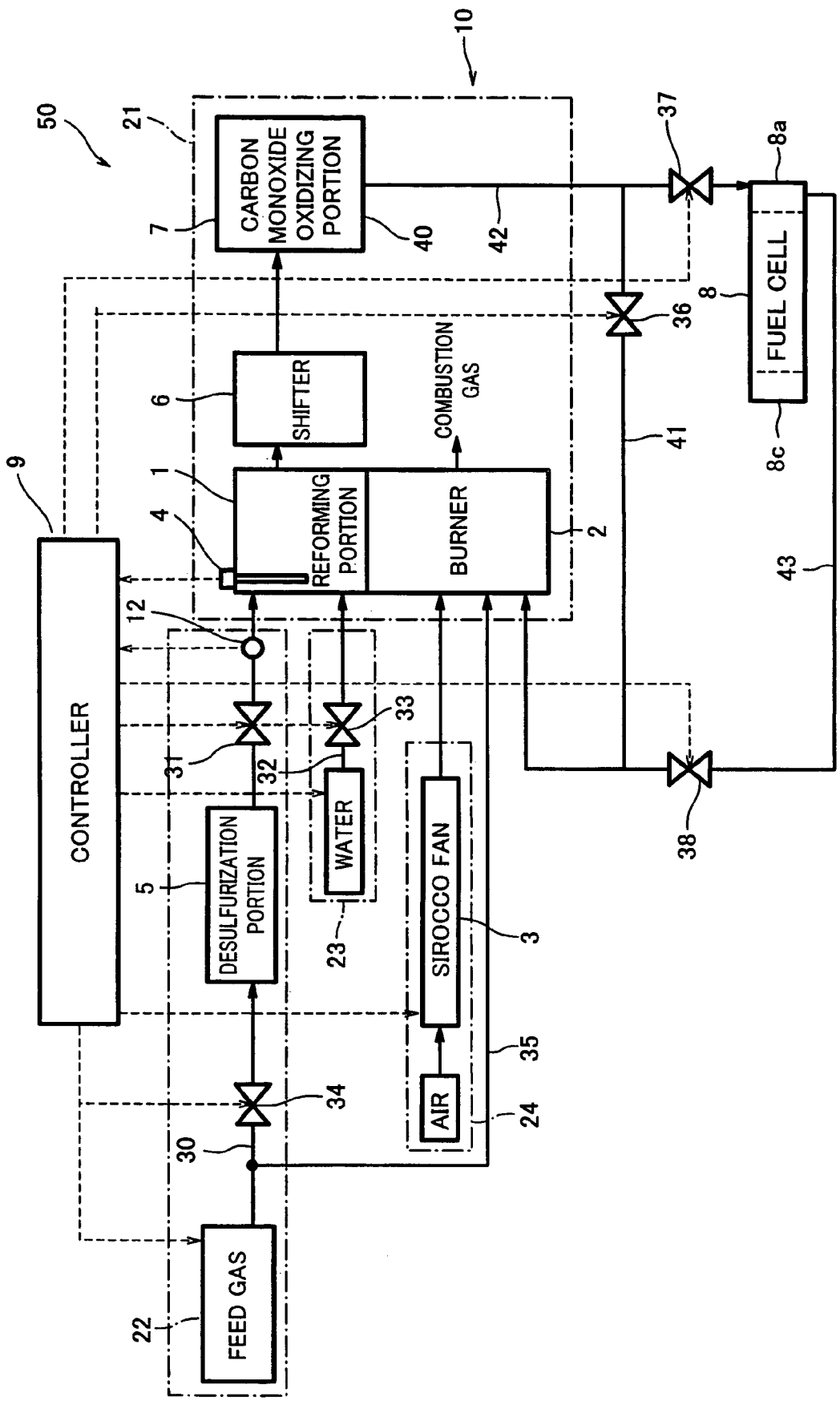
FIG. 5 is a schematic view showing the configuration and the gas supply system of a full cell system according to Embodiment 2 of the present invention.

FIG. 5 is a schematic view showing the configuration and the gas supply system of a fuel cell system according to Embodiment 2 of the present invention.

The configurations of a reformer 21, a material feed system 22, a water supply system 23, and an air supply system 24 in Embodiment 2 are identical to those in Embodiment 1 and therefore not further elaborated upon.

A primary difference in the configuration of Embodiment 2 is that the outlet port 40 provided on the carbon monoxide oxidizing portion 7 of the reformer 21 is coupled to an anode 8*a* of a polymer electrolyte fuel cell 8 via a reformed gas supply path 42 and further the anode 8*a* of the fuel cell 8 is coupled to the burner 2 via the reformed gas return path 43, so that a fuel cell system 50 is constructed with the hydrogen generator 10 and the fuel cell 8.

The configuration adopted is as follows. During a normal operating period of the fuel cell system 50, a reformed gas containing hydrogen as its main component is supplied to the anode 8*a* of the fuel cell 8. The reformed gas that has not been consumed by power generation is returned from the fuel cell 8 to the burner 2 through the reformed gas return path 43 and a third open/close valve 38 disposed in the return path 43, and is burnt inside the burner 2 to maintain the temperature of the reforming catalyst body 74. Note that a cathode 8*c* of the fuel cell 8 is supplied with an oxidizing gas, although the description of the supply route of the oxidizing gas will be omitted. Likewise, through the return gas passage 41 via which the outlet port 40 and the burner 2 are connected, a feed gas and/or a reformed gas is/are appropriately returned upon the start-up of or during the operation of the reformer 21 to the burner 2 so as to be burnt within the burner 2 in order to maintain the elevated temperature of the reforming catalyst body 74. The third open/close valve 38 is also controlled by the controller 9.

Regarding the purging operation, even after the heating by the burner 2 for maintaining the reforming temperature of the reforming catalyst body 74 has been stopped, the purge gas (main component: hydrogen-rich reformed gas) is sent into the anode 8*a* of the fuel cell 8 through the reformed gas supply path 42, causing the anode 8*a* to consume hydrogen and continue power generation of the fuel cell 8, until the temperature of the reforming catalyst body 74 decreases to a predetermined temperature. The predetermined temperature denotes a higher one of the lower limit temperature at which carbon deposition occurs by thermally decomposing the feed gas or the temperature at which steam condensation occurs (100° C.), which has the same meaning as that in Embodiment 1. In this way, hydrogen in the purge gas can be used for power generation as much as possible, preventing wasteful disposal of combustible gas, and thus, the amount of combustible gas that is discharged outside eventually can be reduced. It should be noted that, because attention must be given to keep the concentration of carbon monoxide gas in the reformed gas supplied to the anode 8*a* of the fuel cell 8 at about 10 ppm or less so that the catalyst of the anode 8*a* does not deteriorate, an oxygen gas for reacting with carbon monoxide gas needs to be supplied to the downstream of the shifter 6 that is in the upstream of the carbon monoxide oxidizing portion 7 while power generation is carried out by the fuel cell 8.

Figure 6:
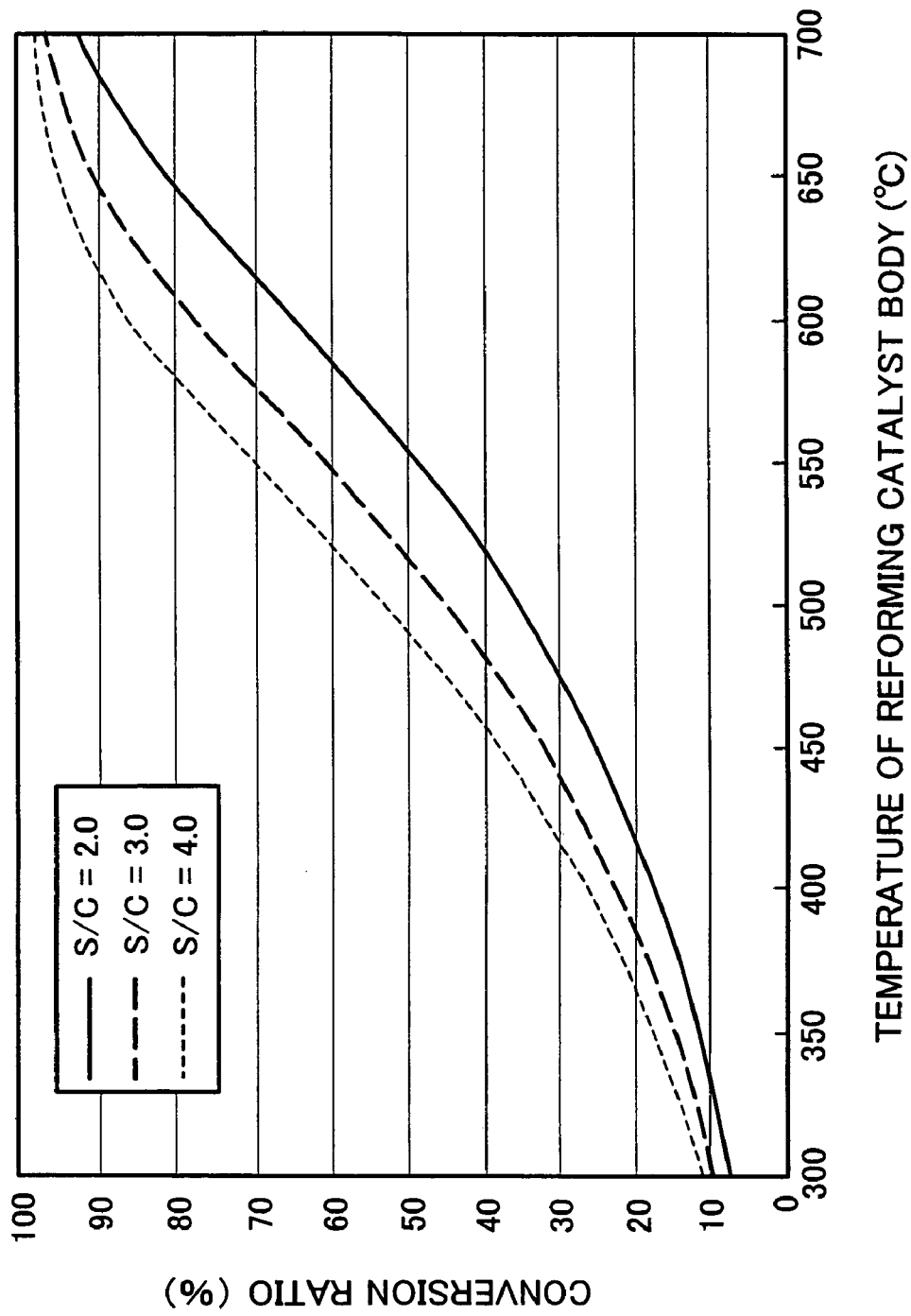
FIG. 6 is a graph for illustrating the relationship between reforming catalyst body temperature and conversion ratio with S/C ratio as a parameter.

Here, the conversion ratio that indicates the proportion of the feed gas converted to hydrogen in the reforming catalyst body 74 shows a different behavior from that in normal power generation, and therefore, it is necessary to take a measure as follows. FIG. 6 illustrates the relationship between temperatures of the reforming catalyst body and conversion ratios with S/C ratios (steam/carbon ratios) being a parameter. FIG. 6 shows that the conversion ratio (%) of hydrogen with the reforming catalyst body 74 with respect to feed gas tends to decrease as the temperature of the reforming catalyst body 74 is reduced.

For this reason, if the S/C ratio is fixed at a certain value, the temperature of the reforming catalyst body gradually decreases over time after the heating by the burner 2 for maintaining the reforming temperature of the reforming catalyst body 74 has been stopped (see FIG. 2), and therefore, due to the effect of this, the conversion ratio also gradually decreases. For this reason, it is necessary to appropriately control, by the controller 9, the ratio obtained by dividing the total amount of hydrogen consumed by a hydrogen reaction inside the fuel cell 8 by the total amount of hydrogen contained in the reformed gas passing through the reformed gas supply path 42 (hydrogen consumption rate) according to the decrease of the temperature of the reforming catalyst. That is, because the proportion of hydrogen in the purge gas reduces according to the gradual decrease of the hydrogen conversion ratio originating from the temperature decrease of the reforming catalyst body 74, the hydrogen consumption rate increases consequently in order to keep a desired amount of generated power.

In addition, during a cooling period of the reforming catalyst body 74, the purge gas (reformed gas) discharged from the fuel cell 8 that has not contributed to the power generation is directly returned into the burner 2 through the reformed gas return path 43, is diluted in the burner 2, and is thrown away; for this reason, it is desirable to increase the hydrogen consumption rate to be greater than that in the heating by the burner 2 for maintaining the reforming temperature of the reforming catalyst body 74 so that it can be used for power generation in the fuel cell 8 as much as possible.

In this way, even after the heating by the burner 2 for maintaining the reforming temperature of the reforming catalyst body 74 has been stopped, power generation with the fuel cell can be continued and energy can be obtained; in addition, the amount of the purge gas that is to be thrown away is reduced and the amount of air for diluting the gas can also be saved, preventing energy loss. It should be noted that since the conversion ratio can increase or decrease even in the case of varying the S/C ratio intentionally (for example, S/C=2.0 to 4.0 as shown in FIG. 6), other than the temperature of the reforming catalyst body 74, it becomes also necessary to increase or decrease the hydrogen consumption rate corresponding to a desired amount of generated power.

Then, at the time when the temperature of the reforming catalyst body 74 drops and reaches a predetermined temperature, water supply is stopped to purge the interior of the reformer 21 only with the feed gas, and simultaneously, the interior of the fuel cell 8 is also purged only with the feed gas.

Then, at the time when the purging with the use of only the feed gas has been completed, the first and second feed gas supply valves 31, 34 disposed on the feed gas supply path 30, the water supply valve 33 disposed on the water supply path 32, the first open/close valve 36 disposed on the return gas passage 41, the second open/close valve 37 disposed on the reformed gas supply path 42, and the third open/close valve 38 disposed on the reformed gas return path 43 are closed and the fuel cell system 50 is hermetically closed, to contain the feed gas inside the reformer 21 and the fuel cell 8. This makes it possible to prevent air from being mixed in the internal atmosphere of the reformer 21 and the fuel cell 8, and to inhibit the combustible feed gas from becoming the combustible concentration range.

Figure 7:
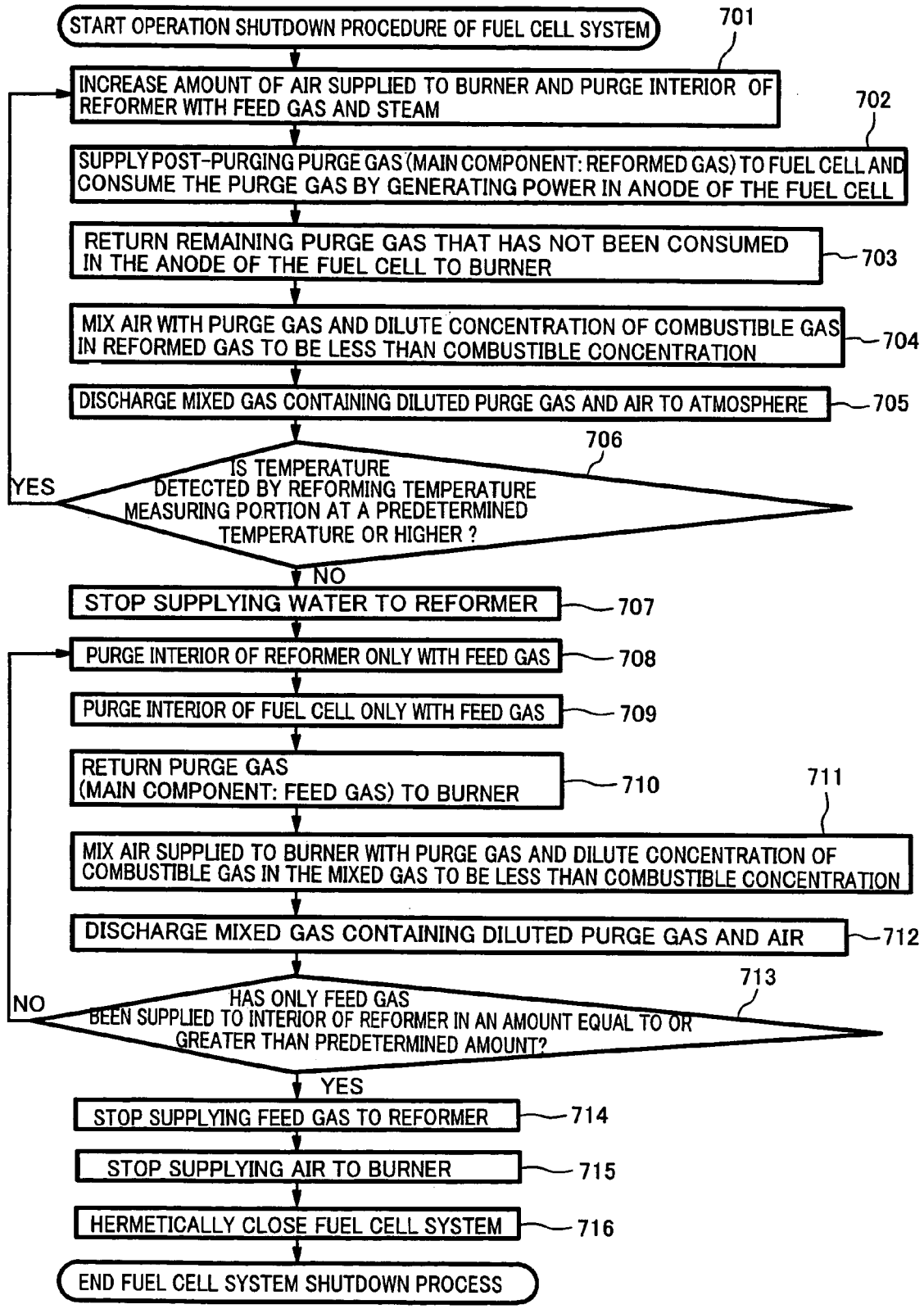
FIG. 7 is a flowchart illustrating an example of a series of process operations in an operation shutdown procedure for a fuel cell system.

Here, an example of a series of process operations in the operation shutdown procedure for the fuel cell system is described with reference to FIG. 7. FIG. 7, which shows steps S701 to S716, is a flowchart illustrating an example of the process operations from stopping of heating by the burner 2 (putting out a flame of the burner 2) for maintaining the reforming temperature of the reforming catalyst body 74 to hermetical closing of the fuel cell system 50. FIG. 7 shows the content of the processes executed by the controller 9 when shutting down the fuel cell system 50.

The controller 9 raises the output power of the sirocco fan 3 to increase the amount of the air supplied to the burner 2, for the purpose of stopping the heating of the reforming catalyst body 74. Meanwhile, a feed gas is supplied from the material feed system 22 through the desulfurizer 5 to the interior of the reformer 21, and steam is also supplied from the water supply system 23 to the interior of the reformer 21; with these gases, the interior of the reformer 21 is purged (step S701). The post-purging purge gas (containing hydrogen and steam-containing reformed gas as its main components) is discharged from the outlet port 40 of the reformer 21 and is supplied to the fuel cell 8, and power generation is continued in the fuel cell 8 so that hydrogen in the purge gas is consumed (step S702).

Subsequently, the remaining purge gas that has not been consumed in the fuel cell 8 is returned to the burner 2 (step S703). Then, the purge gas returned to the burner 2 is mixed with excess air to dilute and the concentration of a combustible gas to be less than the combustible concentration (step S704). The operation of quickly reducing the temperature of the reforming catalyst body 74 with a mixed gas at the same time of diluting the purge gas is the same as that described in Embodiment 1. Thereafter, the mixed gas containing the diluted purge gas and air is discharged to atmosphere (step S705). During the period in which the purge gas is returned to the burner 2 through the reformed gas return path 43, air is constantly supplied from the sirocco fan 3 of the air supply system 24 to the burner 2.

Here, during the period in which the feed gas and steam are supplied to the reformer 21, the controller 9 detects the temperature of the reforming catalyst body 74 with the reforming temperature measuring portion 4 and determines whether or not the detected temperature is at a predetermined temperature or higher (step S706). The predetermined temperature denotes a higher one of the lower limit temperature at which carbon deposition occurs by thermally decomposing the feed gas and the temperature at which steam condensation starts to occur.

If the temperature detected by the reforming temperature measuring portion 4 is at the predetermined temperature or higher (if yes in step S706), the contiguous purging operation of steps S701 to S705 is continued. At the time when the temperature detected by the reforming temperature measuring portion 4 has become lower than the predetermined temperature (if no in step S706), the process proceeds to the next step, and the controller 9 controls the water supply system 23 to stop supplying water (step S707).

Thereafter, the controller 9 allows the purging of the interior of the reformer 21 and the purging the interior of the fuel cell 8 only with the feed gas (steps S708 and S709). The post-purging purge gas (main component: feed gas) is returned to the burner 2 (step S710), and the purge gas is mixed with excessive air sent from the sirocco fan 3 to the burner 2 to dilute the concentration of a combustible gas in the mixed gas to be less than the combustible concentration (step S711). Then, the mixed gas containing the diluted purge gas and air is discharged to atmosphere (step S712). During the period in which the purge gas is returned to the burner 2 through the reformed gas return path 43, air is constantly supplied from the sirocco fan 3 of the air supply system 24 to the burner 2.

Here, during the period in which only the feed gas is supplied to the interior of the reformer 21, the controller 9 monitors the total amount of the supplied feed gas with the feed gas flow rate meter 12 (see FIG. 5) and determines whether or not only the feed gas has been supplied to the reformer 21 in an equal to or amount greater than a predetermined amount (step S713). The set value of the predetermined amount should be at least equal to or greater than the internal volume of the reformer 21, desirably 2-3 or more times the internal volume. Until the supply of the feed gas reaches the predetermined amount (if no in step S713), the contiguous purging operation from step S708 to step S712 is continued. At the time when the supply of the feed gas has reached the predetermined amount (if yes in step S713), the process proceeds to the next step, and the controller 9 controls the material feed system 22 to stop supplying the feed gas to the reformer 21 (step S714).

After stopping the feed gas supply, the controller 9 halts the operation of the sirocco fan 3 to stop the air supply to the burner 2 (step S715). Then, the first and second feed gas supply valves 31, 34, the water supply valve 33, and the first, second, and third open/close valves 36, 37, 38 are closed, and the fuel cell system 50 is hermetically closed (step S716) to end the operation shutdown procedure of the fuel cell system 50.

With the operation shutdown procedure of the fuel cell system 50, the interior of the reformer 21 can be purged with a feed gas, and the post-purging feed gas and/or reformed gas can be efficiently processed by diluting the gas (gases) within the burner 2; moreover, cooling of the burner 2 can be performed quickly. Furthermore, even after the heating by the burner 2 for maintaining the reforming temperature of the reforming catalyst body is stopped, a reformed gas is supplied to the fuel cell 8 to continue power generation with the anode 8a of the fuel cell 8 so that energy can be obtained; the amount of purge gas that is to be disposed of can be minimized and the amount of air used for diluting the purge gas can also be saved, leading to reduction in energy loss.

From the foregoing description, numerous improvements and other embodiments of the present invention will be readily apparent to those skilled in the art. Accordingly, the foregoing description is to be construed only as illustrative examples and as being presented for the purpose of suggesting the best mode for carrying out the invention to those skilled in the art. Various changes and modifications can be made in specific structures and/or functions substantially without departing from the scope and sprit of the invention.

What is claimed is:

1. A method of shutting down a hydrogen generator, the hydrogen generator including a reformer having a reforming catalyst body configured to generate a hydrogen-rich gas from a combustible feed gas and water, and a burner configured to heat said reforming catalyst body heat-exchangeably, the method comprising the steps of:

purging an interior of said reformer by supplying the combustible feed gas to an interior of said reformer; and diluting the concentration of a combustible gas in a mixed gas containing the feed gas sent out from said reformer and air inside said burner to be less than the combustible concentration by increasing an amount of air supplied to an interior of said burner when purging the interior of said reformer.

2. The method of shutting down a hydrogen generator according to claim 1, wherein, after the concentration of the combustible gas has been diluted to be less than the combustible concentration, the combustible gas is discharged to atmosphere.

3. The method of shutting down a hydrogen generator according to claim 1, wherein, after diluting the concentration of the combustible gas in a mixed gas containing the feed gas sent out from said reformer and the air inside said burner to be less than the combustible concentration, the temperature of said reforming catalyst body is reduced by continuously supplying the air to said burner.

4. The method of shutting down a hydrogen generator according to claim 1, wherein a flame of said burner is put out by increasing said amount of air supplied to said interior of said burner when purging the interior of said reformer.

* * * * *